INVENTOR
SAMUEL L. SEYMOUR

Oct. 27, 1970          S. L. SEYMOUR          3,536,464
         METHOD OF AND APPARATUS FOR GLASS SHEET
              SUPPORT DURING THERMAL TREATMENT
Filed Aug. 9, 1967                              4 Sheets-Sheet 4
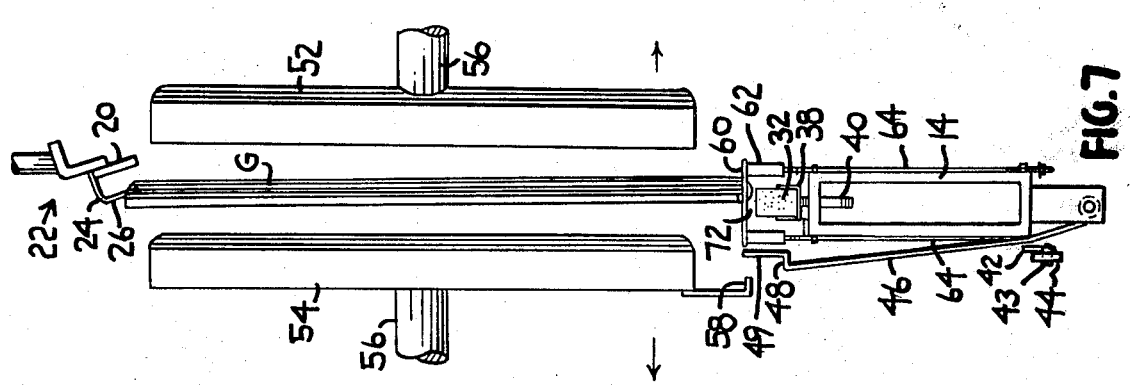
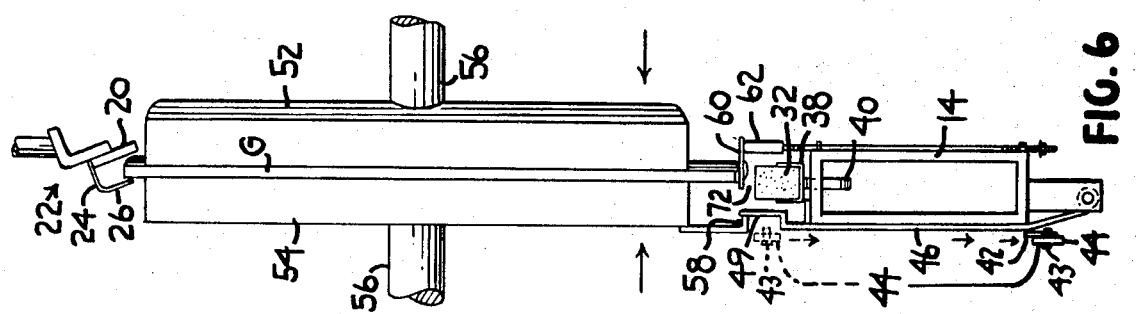
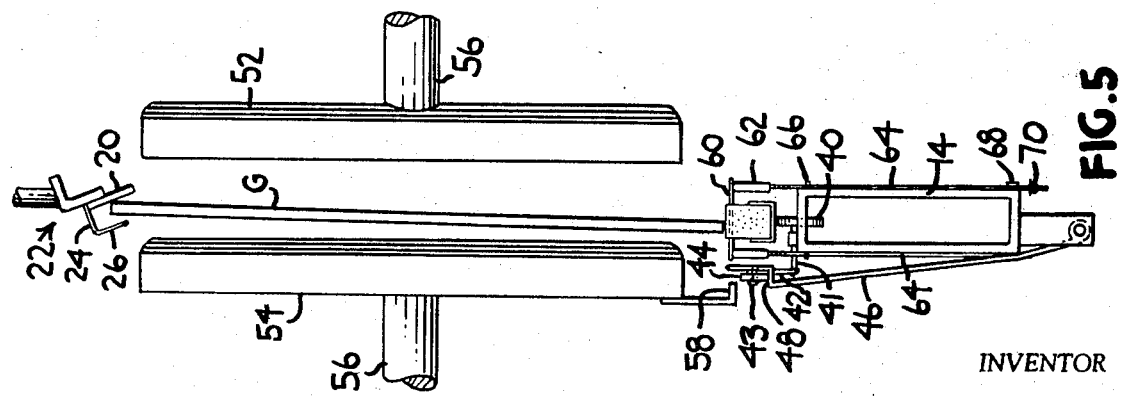
INVENTOR
SAMUEL L. SEYMOUR
BY
Chisholm and Spencer
ATTORNEYS

United States Patent Office 3,536,464
Patented Oct. 27, 1970

3,536,464
METHOD OF AND APPARATUS FOR GLASS SHEET SUPPORT DURING THERMAL TREATMENT
Samuel L. Seymour, Oakmont, Pa., assignor to PPG Industries, Inc., a corporation of Pennsylvania
Filed Aug. 9, 1967, Ser. No. 659,523
Int. Cl. C03b 23/02
U.S. Cl. 65—104
12 Claims

ABSTRACT OF THE DISCLOSURE

Method and apparatus for supporting the lower edge of a glass sheet in an upright position for thermal treatment such as press bending. The lower edge support comprises a vertically movable support member of refractory material having an upward facing edge surface conforming to the shape of the lower edge and notches along its upper edge, each of which receives a fixed support member. The fixed members are aligned in positions parallel to the lower edge of the glass sheet and extend transversely of the glass thickness. The movable member moves upward to an elevated position to support the lower edge of a glass sheet during a heat-softening step of a press bending cycle. When the heat-softened glass sheet is shaped by engagement between a pair of shaping molds, one of the molds actuates a trigger which releases the movable member to lower the bent glass sheet onto the spaced fixed members. The glass is immediately transported to a chilling station where it is tempered by chilling air blasts while so supported on the spaced fixed members.

---

The present invention relates to glass sheet support during thermal treatment, by novel method and specifically an apparatus for supporting glass sheets for thermal treatment, and particularly relates to supporting a glass sheet in an upright position along its longest edge and balancing said sheet along one or more other edges during a thermal operation wherein the glass sheet is heated and then rapidly chilled for heat strengthening or tempering and may include another step such as coating and/or press bending before tempering. Glass sheets having non-linear edges are required for present day automobile backlights to enable the backlights to fit into frames on the automobile body conforming to the shapes desired by automobile stylists.

Glass sheets have been thermally treated while conveyed through a furnace of the tunnel-type, and then through a chilling apparatus with or without an intermediate operation while supported in a horizontal or vertical or an oblique plane. Expensive equipment is available to support glass sheets vertically. Use of such equipment in the past has been limited to tong gripping apparatus that continuously grips glass sheets at their upper edge portion and apparatus that continuously supports glass sheets along their longest edge in an upright position throughout the thermal treatment. Distortion in a hermally treated glass sheet is a time-temperature-glass mass relationship and any portion of a glass sheet that is in continuous contact with a solid member such as tongs or supports throughout the entire operation is likely to become distorted. This likelihood of localized distortion increases with greater mass of glass handled. The present invention renders expensive equipment which is still in operating condition capable of supporting larger glass sheets than previously handled along a non-linear edge in an upright position without requiring tongs that continuously grip the glass or lower edge supports that remain in continuous contact with the same portion of the lower edge throughout the entire operation.

An object of the present invention is to provide improvements in apparatus for heat treating glass sheets while supported in an upright position. In such apparatus, tunnel-like furnaces have cross-sections that are longer in their vertical dimension than in their horizontal dimension for receiving glass sheets in an upright orientation and conveying the latter along a horizontal path of travel while they are heated in preparation for subsequent treatment. In the past, such furnaces have been used with tongs for suspending glass sheets vertically during their movement through the furnace and through subsequent glass treating apparatus. Tongs indent the glass in the regions of gripping and also tend to stress the glass locally in the vicinity of the tong gripping elements. This stressing induces fracture in the glass.

In order to avoid marring of the optical properties resulting from the use of tongs, the glass industry has developed devices for supporting the glass in a vertical or substantially vertical position involving supporting the bottom edge and balancing the sheet vertically. The latter may be accomplished by loosely engaging one or more sides or the top edge of the treated glass sheet with balancing members that support the glass in either a vertical plane or one making a very small angle to a vertical plane.

Such devices in the past have been characterized by spaced supports suitable for supporting glass sheets having only a limited mass per unit length. Supporting heavier sheets on such spaced lower edge supports resulted in undesirable optical distortion along the supported edge. The present invention makes it possible to support glass sheets having significantly greater mass per unit length than said limited mass along substantially the entire length of either straight or non-linear elongated edges during the heating step of a thermal treatment without introducing the optical distortion obtained with prior art apparatus.

Apparaus such as that disclosed and claimed in U.S. Pat. No. 3,353,945 of James H. Cypher, avoided the use of tongs for supporting glass in an upright position, but was limited in its effectiveness to support automobile sidelights weighing a maximum of about ⅓ pound per inch of length of supported edge. The present invention provides means for supporting glass sheets weighing 30 pounds and more along their bottom edge 46 inches long, or .65 pound per inch of length, in a manner that reduces glass slumping or lower edge distortion during the thermal treatment.

Another problem involved in shaping backlights rather than sidelights is that backlights have to be shaped about a vertical axis of bending rather than a horizontal axis of bending which was suitable for sidelights. The present invention provides a method and apparatus for handling glass sheets for thermal treatment in which the glass sheet is oriented so that its longest edge is disposed as its lower edge and said sheet is supported along said longest edge throughout a substantial portion of its length during the heating phase of a thermal treatment and along previously unsupported portions subsequent to said heating phase during the latter stages of said thermal treatment. This sequential support of different portions of the lower edge has produced fabricated glass sheets having less distortion along the supported lower edge compared to that which resulted from utilizing prior art bottom edge supports and also resulted in edge stress of a magnitude associated with the strongest edges produced on prior art apparatus using permanent bottom edge supports.

The present invention also provides apparatus for supporting a rigid glass sheet in an upright position for thermal treatment comprising a support for the bottom edge of said glass sheet, said support comprising a notched refractory member having an upper glass engaging surface and a plurality of notches, and a rigid glass sheet supporting member in each of at least two of said notches, preferably all of said notches, means for supporting said refractory member in an elevated position, means releasing said supporting means to permit said refractory member to move into a retracted position and permit said rigid members to contact said glass sheet and means for balancing said sheet in an upright position.

In an illustrative embodiment of the present invention, the refractory member has a length at least as long as the longest edge to be supported and an upper surface conforming to the shape of said longest edge to support a major portion of its length when elevated into a glass supporting position. The refractory member is composed of a material capable of withstanding repeated temperature cycling in a range normally encountered in glass sheet tempering. This range varies from a minimum of less than 100 degrees Fahrenheit to a maximum of about 1400 degrees Fahrenheit. The refractory material has a thermal conductivity considerably less than that of iron and steel alloys.

The apparatus is used in combination with a tunnel-type furnace, a press bending station and a chilling station and a conveyor extending through the furnace, the press bending station and the chilling station. In the illustrative embodiment of the present invention, the press bending station comprises a pair of shaping molds having complementary surfaces facing one another, means for providing relative movement between such shaping molds to cause said shaping molds to sandwich a heat-softened glass sheet therebetween to shape the latter when the molds are in a glass engaging position and to be spaced from one another when the molds are in a retracted position. One of the shaping molds has an actuator attached thereto to contact the releasing means when the shaping molds are in the glass engaging position.

In cases where the apparatus is used for supporting a glass sheet whose longest edge is non-linear for said press bending, the refractory member has a minimum length equal to that of the non-linear edge. The upper glass engaging surface of the refractory member used with apparatus for press bending glass about an axis of bending disposed about an axis of bending extending at an angle to the horizontal has a contour that conforms to the shape of the non-linear edge of the bent glass sheet along the length thereof and sufficient width to adjust for the shaping of the glass sheet about said non-horizontal bending axis.

The substantially continuous support of the shaped bottom edge of the glass sheet during the heating minimizes the pressure per unit length applied to the supported glass portion and thus minimizes distortion along the supported edge. The ability of the refractory member to retract from the glass sheet when the glass is engaged between the shaping molds reduces the area of glass sheet lower edge supported from substantially its entire length before it undergoes shaping to spaced portions supported by the spaced rigid glass sheet supporting members after the glass is shaped. The spaced supports expose the portion of the chilling fluid that is applied after the glass sheet is bent to temper the latter. In this manner, substantially the entire lower edge of the glass sheet is uniformly exposed to chilling fluid and the glass sheet edge temperature lowered to below a deformation temperature rapidly enough to limit the severity of distortion.

The present invention will be understood more clearly in the light of a description of an illustrative embodiment thereof which follows. In the drawings which form part of the illustrative embodiment of the present invention, and wherein like reference numbers refer to like structural elements;

FIGS. 5, 6 and 7 are fragmentary schematic views showing the operation of an illustrative embodiment of the present invention adapted to a press bending operation showing an actuating means attached to one of the shaping molds to actuate the lower glass edge support so that its notched refractory member moves from a lower glass edge supporting position depicted in FIG. 5 to a recessed position in FIG. 6 when the shaping molds engage the glass and remains in such position when the shaping molds are retracted from glass engaging position as shown in FIG. 7.

Figure 2:
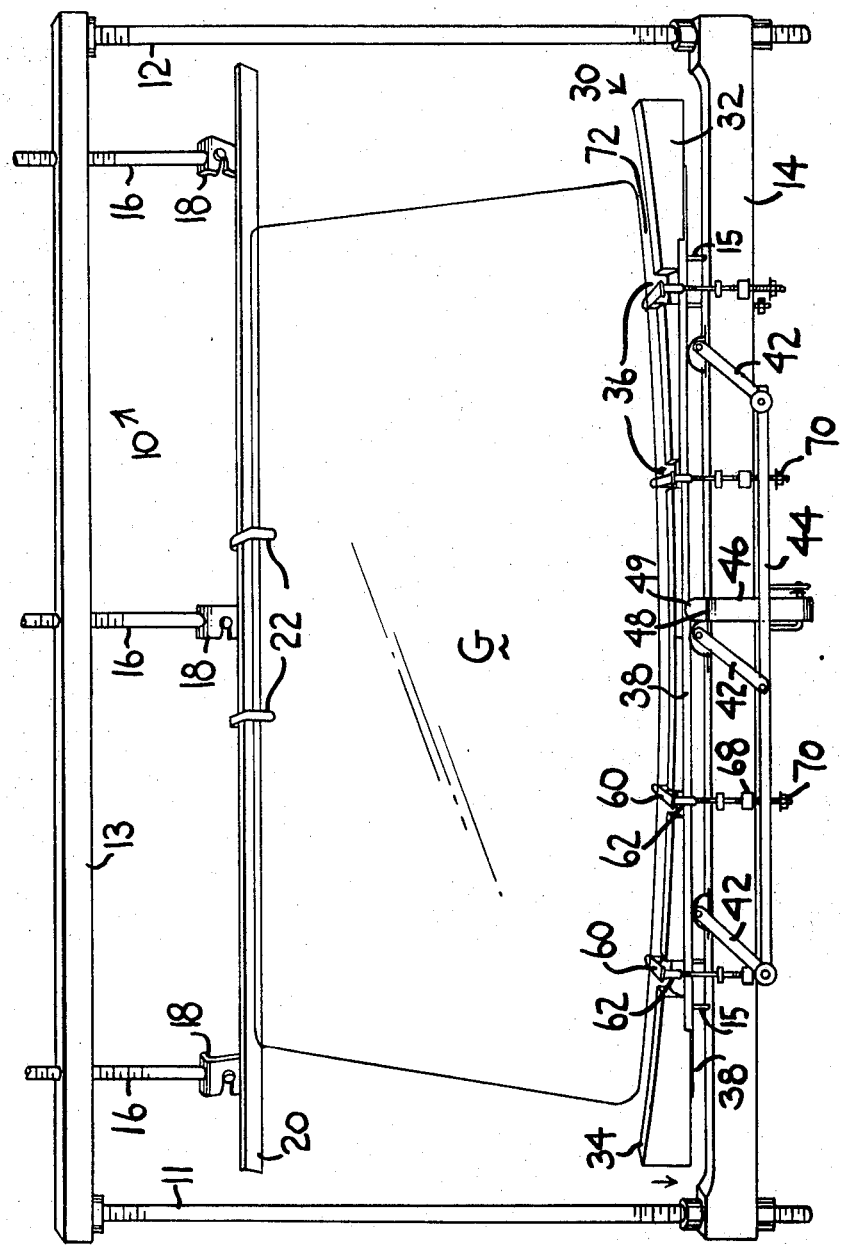
FIG. 2 is a fragmentary view similar to FIG. 1 showing the manner of supporting the glass sheet when it is being chilled.

Referring to the drawings, an open frame 10 comprises a pair of vertical rods 11 and 12 interconnecting an upper horizontal pipe 13 and a lower horizontal pipe 14. A pair of guide pins 15, (FIG. 2) are attached at their lower ends to the pipe 14 and extend upward therefrom. A plurality of vertically extending, externally threaded rods 16 extend both upward and downward from the upper horizontal pipe 13. The upper portions of the threaded rods 16 are connected to a runner (not shown) that rides on the upper surface of a plurality of conveyor rolls (also not shown) in a manner well known in the art.

The lower ends of the threaded rods 16 terminate in brackets 18 which are connected to a horizontally extending bar 20. Bar 20 is slightly longer than the sheet of glass G to be processed and is oriented in an oblique plane to balance the upper edge of a flat glass sheet G. The bar 20 is preferably of a material that is not affected by the temperature cycle normally found in glass tempering, for example, stainless steel of sufficient thickness (about ⅛ inch, for example) to resist deformation while balancing the upper edge of a glass sheet during heating.

Spaced metal pins 22 are attached at their upper ends to the upper end of bar 20 and extend downward in spaced relation to bar 20. Each pin 22 is of angular configuration and comprises an upper arm 24 extending outward from the bar 20 a distance slightly greater than the thickness of the glass sheet G and a lower arm 26 which extends downward from the upper arm 24 a sufficient distance to insure that the bent glass sheet is engaged at spaced points where it pivots away from the bar 20 and contacts the spaced pins 22 after the glass has been shaped.

The structural elements 20, 22, 24 and 26 enumerated above comprise a glass balancing means of the type generally described for performing a method described and claimed in U.S. Pat. No. 3,298,809 to Herbert W. Barch and Clement E. Valchar, issued on Jan. 17, 1967.

Figure 1:
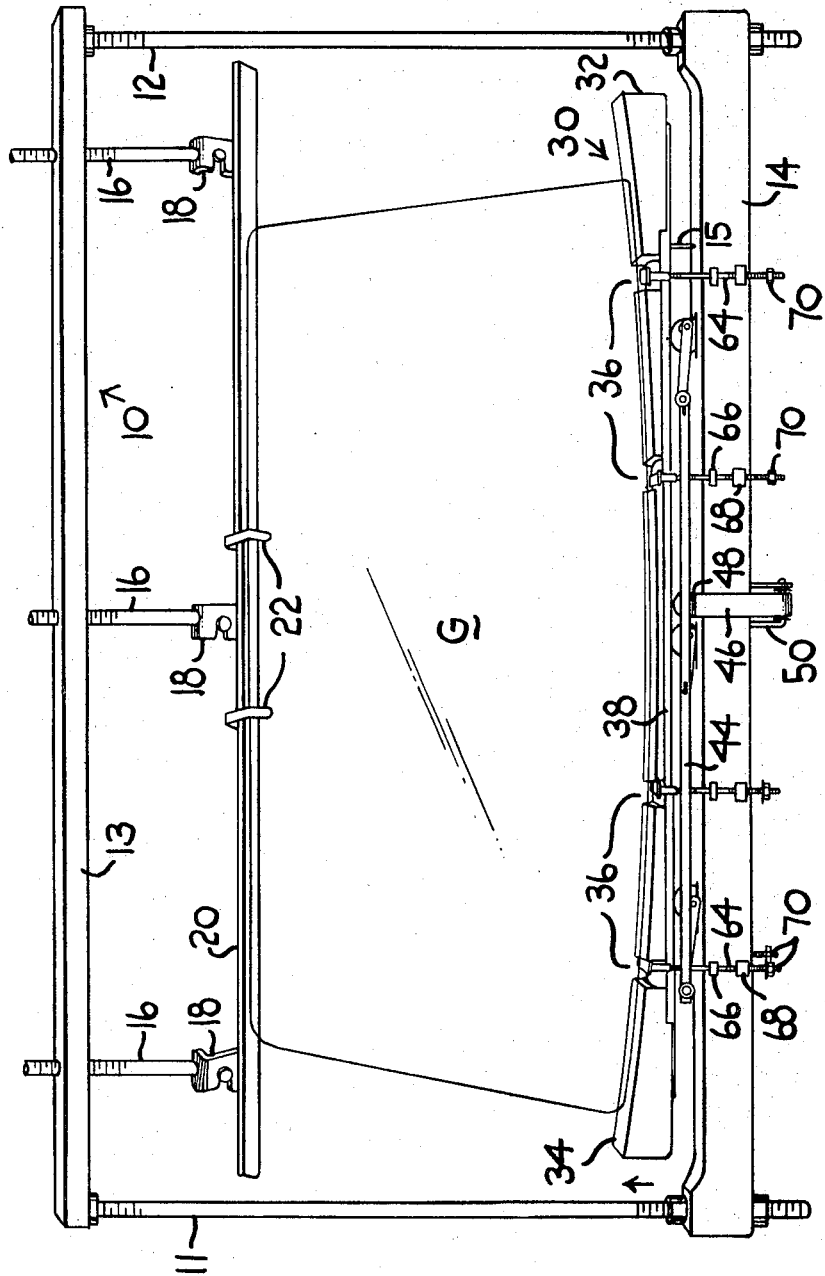
FIG. 1 is an elevational perspective view of a portion of glass sheet supporting apparatus showing how the glass is supported during the heating phase of a heating and chilling operation necessary to temper the glass.

The present apparatus also includes a support for the lower edge of the glass sheet G which is depicted generally by the reference character 30 (FIG. 1).

The lower edge support 30 comprises a refractory support member 32 having a curved upper glass engaging surface 34 which conforms in both elevation and plan to the shape of the bottom edge of the glass sheet that is supported on the refractory support member 32 and is sufficiently wide to support the lower edge of the glass sheet G in both its original flat configuration and its ultimate curved configuration. The curved upper glass engaging surface 34 of the refractory support member 32 is continuous throughout its length except that it comprises a plurality of notches 36 for reasons to be discussed subsequently. The refractory support member 32 has its lower portion enclosed in a metal channel 38 for reasons to be explained later.

The lower horizontal pipe 14 has a series of longitudinal slots, each receiving a different one of a plurality of cams 40. Each of the cams is eccentrically fixed to an eccentric pin 41. Each eccentric pin 41 is mounted for rotation relative to the upper surface of the lower horizontal pipe 14. An arm 42 is provided for each cam 40. Each arm 42 is rigidly mounted at one end to one of the eccentric pins 41 and is pivotally attached at its other end to a different one of a plurality of link pins 43. The latter are provided one to a slot of a slotted bar 44.

A spring 46 having a horizontal ledge 48 and a vertical flange 49 formed on its upper end is supported from a support bracket 50 mounted to the lower horizontal pipe 14. The slotted bar 44 is constructed and arranged to be lifted into a position wherein it is supported on the horizontal ledge 48 on the spring 46. However, when flange 49 of the spring 46 is pressed inward, the ledge 48 is displaced from its supporting position for slotted bar 44. Gravity causes the latter to fall, thus causing arms 42 to pivot downward and rotate the cams 40 about eccentric pins 41. This enables the refractory support member 32 which rests on cams 40 to follow the movement of the periphery of the cams 40 from an upper position shown in FIGS. 1, 3 and 5 to a retracted position shown in FIGS. 2, 4, 6 and 7.

The cams 40 are arranged in such a manner that they engage the metal channel reinforcements 38 of the refractory support member 32. In order to insure long wear, the cams 40, like the channel 38, are composed of a material that can withstand the temperature cycle of glass tempering, such as polished stainless steel.

When the present invention is used for a press bending operation, it is preferable to have actuating means to actuate the downward movement of the refractory support member 32 in response to the shaping of the glass sheet. FIGS. 5 to 7 depict two shaping molds with complementary shaping surfaces adapted to sandwich a heat-softened glass sheet to shape the latter about a vertical axis of bending to form a curved backlight for an automobile. The shaping molds comprise a first mold 52 having a concave shaping surface and a second mold 54 having a convex glass shaping surface, each of the molds being actuated by pistons 56 for movement between a glass engaging position shown in FIG. 6 and a retracted position shown in FIG. 7.

The mold 54 has an actuator pin 58 which engages the vertical flange 49 extending upward from the horizontal ledge 48 of the spring 46 to permit the slotted bar 44 to move from the position before the glass has been contacted by the molds depicted in FIG. 5 and by the dotted position of FIG. 6 to the full line position of FIG. 6.

When the glass has been shaped and the shaping molds 52 and 54 retracted, the glass is moved into a chilling area where it is chilled rapidly enough to impart the degree of temper desired depending upon the nature of the product to be formed. The carriage 10 is then returned to a loading station where an operator lifts the slotted bar 44 into position of reengagement by the upper ledge 48 of spring 46 and mounts a glass sheet in position to be supported with substantially the entire length of its lower edge resting on the curved upper glass engaging surface 34 of the refractory support member 32 and with the upper edge of the glass sheet initially resting on the bar 20.

Figure 3:
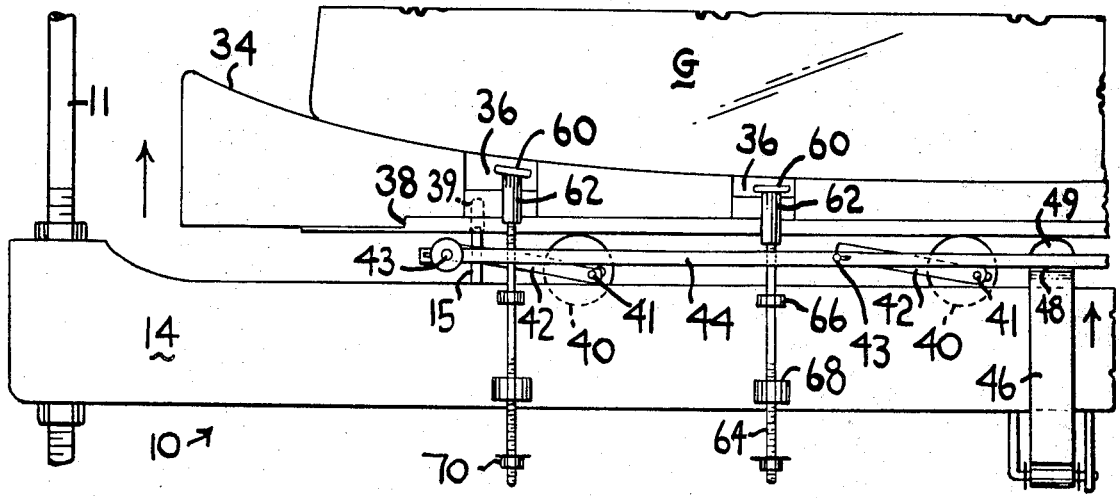
FIG. 3 is a fragmentary, enlarged view of the glass support apparatus when the apparatus is in the situation depicted in FIG. 1.
Figure 4:
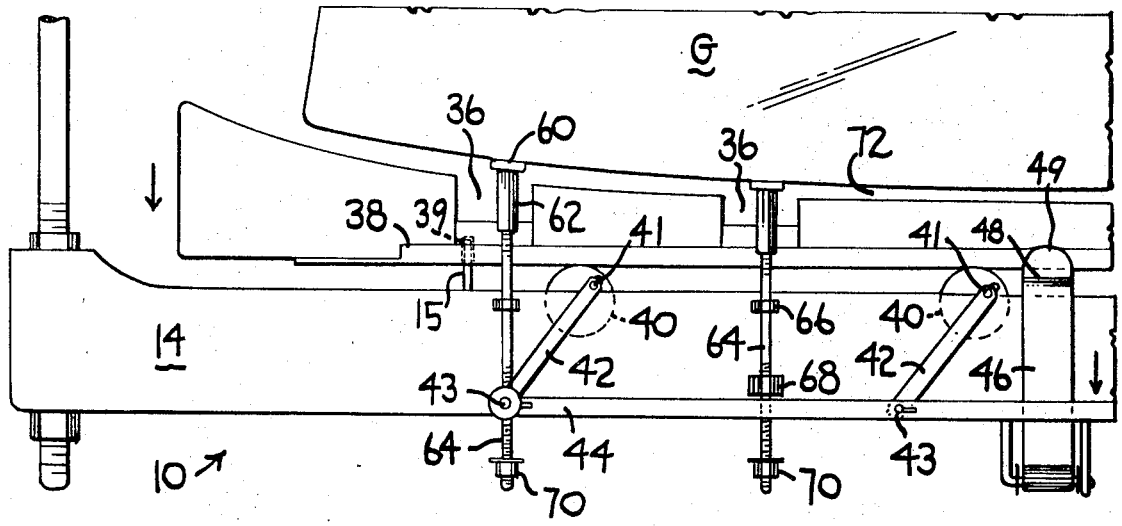
FIG. 4 is a view similar to FIG. 3 showing how the glass is supported for chilling.

When the refractory support member 32 is dropped from the glass supporting position of FIGS. 1, 3 and 5 to the recessed position of FIGS. 2, 4, 6 and 7, the glass is supported on a plurality of fixed, spaced supports, such as metal straps 60. Each of the metal straps extends across one of the notches 36 in the upper curved glass engaging surface 34 of the refractory support member 32. The metal straps are approximately ¼ inch wide and ⅛ inch thick and are each attached at their longitudinal extremities by welding, for example, to the upper ends of cylindrical sleeves 62 which receive the upper ends of externally threaded rods 64. The latter extend through eyes 66 rigidly attached to the outer faces of the lower horizontal pipe 14.

Each externally threaded rod 64 is capable of vertical adjustment, thereby adjusting the vertical position of its supported sleeve 62 and the metal strap 60 by rotation within an internally threaded housing 68. Set screws 70 are also provided to lock each rod 64 in its desired position. This locks the position of each metal strap 60.

It will thus be seen that the glass sheet G has its longest edge supported over substantially its entire length when the refractory support member 32 is in its upper glass supporting position and the glass sheet is heated to the elevated temperature needed for thermal processing. However, when the actuator pin 58 engages the vertical flange 49 of the spring 46 to release the slotted bar 44, the refractory support member 32 drops away as depicted in FIGS. 2, 4, 6 and 7, thus leaving the spaced metal straps 60 to support the lower edge of the bent glass at spaced positions therealong and providing a space 72 between the lower edge of the glass sheet (FIGS. 2 and 4) and the upper surface 34 of the member 32, thus permitting free flow of chilling medium along the lower edge of the glass as well as throughout the rest of the glass sheet margin.

In a typical successful apparatus, the refractory support member was made of a material sold under the trade name of Marinite No. 65 by the Johns Manville Company. This material had a conductivity of 1.80 British thermal units per square foot per hour per degree Fahrenheit per foot of thickness at 600 degrees Fahrenheit and was selected because it could be cut easily and had some compressive strength in thin sections.

In a typical operation for producing plate glass backlights having a nominal thickness of ¼ inch, a succession of glass sheets were passed through a tunnel-type furnace in 4 minutes and 45 seconds with the furnace coils kept at a temperature of 1370 degrees Fahrenheit in the upper portion, 1380 degrees in the middle portion and 1490 degrees Fahrenheit in the lower portion of the furnace. The glass was then transferred from the furnace to a shaping station in 4 seconds, the presses closed to engage the heated glass in 3.5 seconds and held in pressurized engagement against the opposite surfaces of the glass sheet for 2 seconds. The shaping molds retracted in 2 seconds and another 3 seconds was required to transfer the bent glass sheets to the chilling area.

The bent glass sheets were immediately conveyed between spaced nozzles of a chilling station. Air was applied through the nozzles at a pressure of 2¾ ounces per square inch against the concave side of the bent glass and 3¼ ounces per square inch against the convex side of the bent glass. The nozzle apertures were arranged in sets spaced from one another 6 inches to provide a 6 inch space for the bent glass sheets. Each set of nozzles was arranged on 2 inch centers in a checkerboard pattern and moved in a circular orbit of 3½ inches diameter. The nozzles had a circular cross-section of ½ inch diameter.

The material used to support the bottom edge of the glass sheet during heating has a lower thermal conductivity and heats more slowly than stainless steel type metals previously used for lower edge supports. This latter property, during a heat-up cycle, caused the glass support edge to attain a temperature less than that which was obtained on a metal support during the same heating cycle. The lower glass edge support temperature caused the glass to have a lower viscosity and therefore less distortion. Furthermore, the fact that the glass supporting surface 34 of the refractory support member was curved to conform throughout the entire length of the glass reduced the pressure applied along the supported edge surface caused by the mass of the supported sheet. This lower pressure along the supported edge reduced the tendency of the lower edge of the glass sheet to distort.

It is well known that glass is strong when stressed in compression. In addition to providing improved optics along the supported edge compared with other type of supports, the stress along the supported edge was comparable to the highest compressive stresses obtained using other types of lower edge support. The stress measurements indicated that press bent sheets supported on the present type of support during heating, pressing and chilling had satisfactory edge strength.

Various glass sheets of the same composition and nominal thickness were subjected to similar heating, shaping and cooling cycles while supported on different types of lower edge supports. Supported edges of glass sheets so treated while continuously supported on a refractory support member such as member 32 without notches therein developed compressive stresses ranging from 2500 to 4250 pounds per square inch. Glass sheets supported continuously along their bottom edge on spaced metal fingers developed an average compressive edge stress along their supported lower edge of 8,400 pounds per square inch after the tempering operation. Edges of glass sheets continuously supported on wire screen supports had an average compressive edge stress of about 6,400 pounds per square inch after such treatment. Supporting the glass on a notched refractory member during heating before shaping and on spaced metal finger type supports spaced from the refractory member during chilling after shaping developed compressive stress along the supported edge ranging from 6800 to 8000 pounds per square inch. There was sufficient improvement in the optical properties of the supported edge using the present invention combined with no significant loss in compressive stress along the supported edge compared to those obtained from other types of lower edge supports to satisfy those performing the experiments that the two-component lower edge support of the present invention had merit.

What is claimed is:

1. In a method of heating glass sheets substantially vertically supported along the lowermost edge thereof to a temperature sufficient to permit a desired treatment thereof and thereafter cooling said sheets, the improvement comprising:
   positioning each glass sheet in an upwardly extending direction,
   supporting said glass sheet along spaced, elongated portions of the lowermost edge thereof,
   loosely engaging a portion of the glass sheet at a location spaced from said lowermost edge of the sheet to balance said sheet in said upwardly extending direction,
   heating said glass sheet to a temperature sufficient to soften said sheet while so supported,
   withdrawing said support of said heated glass sheet along said spaced elongated portions of said lowermost edge,
   supporting said heated glass sheet along spaced short portions of the lowermost edge of said sheet intermediate said spaced, elongated portions of the lowermost edge of said sheet initially supported,
   subjecting said heated glass sheet to said desired treatment and, thereafter,
   cooling said heated glass sheet while supported along said spaced short portions of the lowermost edge of said glass sheet.

2. A method as in claim 1, in which the heat softened sheet is pressed between a pair of molds having complementary surfaces between said heating and said chilling steps.

3. A method as in claim 1, wherein the substantial portion of the length of said longest edge that is supported during said heating is different from the spaced portions supported during said chilling.

4. A method as in claim 3, in which the heat softened sheet is pressed between a pair of molds having complementary surfaces between said heating and chilling steps.

5. Apparatus for supporting a glass sheet in an upright position for thermal treatment comprising a support for a lower edge of said glass sheet comprising a notched refractory member having an upper glass engaging surface and a plurality of spaced notches and a rigid glass sheet supporting member in each of said notches, means for supporting said refractory member in an elevated position, means releasing said supporting means to permit said refractory member to move into a retracted position and permit said rigid members to contact said glass sheet lower edge at spaced portions therealong, and means for balancing said sheet in an upright position.

6. Apparatus as in claim 5, wherein said refractory member is composed of a material capable of withstanding repeated temperature cycling in the range normally encountered in glass sheet tempering (between less than 100 degrees Fahrenheit and about 1400 degrees Fahrenheit) and has a thermal conductivity considerably less than that of iron and steel alloys.

7. Apparatus as in claim 5, in combination with a tunnel-type furnace, a press bending station and a chilling station and a conveyor extending through said furnace, said press bending station and said chilling station, wherein said press bending station comprises a pair of shaping molds having complementary surfaces facing one another, means for providing relative movement between said shaping molds to cause said shaping molds to sandwich a heat-softened glass sheet therebetween to shape the latter in a glass engaging position and to be spaced from one another in a retracted position, one of said shaping molds having an actuator attached thereto to contact said releasing means when said shaping molds are in said glass engaging position.

8. Apparatus as in claim 5 for supporting a glass sheet along a non-linear edge for said thermal treatment wherein said refractory member has a minimum length equal to that of said non-linear edge and an upper glass engaging surface having a contour that conforms to the shape of said non-linear edge along the length thereof.

9. Apparatus as in claim 8, wherein said upper glass engaging surface has a contour that conforms in both elevation and plan to the shape of the glass sheet after bending and has sufficient width to accommodate the supported glass sheet both before and after the latter is bent about a vertical axis of bending.

10. A method as in claim 1, wherein the desired treatment of the substantially vertically supported heated glass sheet comprises heat strengthening said sheet.

11. A method as in claim 1, wherein the desired treatment of the substantially vertically supported heated glass sheet comprises tempering said sheet.

12. A method as in claim 1, wherein the desired treatment of the substantially vertically supported heated glass sheet comprises coating said sheet.

References Cited

UNITED STATES PATENTS 3,220,817  11/1965  Malobicky et al. _____ 65—104
3,220,818  11/1965  Barch et al. _____ 65—106

ARTHUR D. KELLOGG, Primary Examiner

U.S. Cl. X.R.

65—106, 114, 289